United States Patent [19]

Wike, Jr.

[11] Patent Number: 4,935,609

[45] Date of Patent: Jun. 19, 1990

[54] COMPOSITE LENS FOR A HAND-HELD BAR CODE LABEL READER

[75] Inventor: Charles K. Wike, Jr., Cambridge, Ohio

[73] Assignee: NCR Corporation, Dayton, Ohio

[21] Appl. No.: 284,646

[22] Filed: Dec. 15, 1988

[51] Int. Cl.⁵ ............................................. G06K 7/10
[52] U.S. Cl. ..................................... 235/472; 235/467
[58] Field of Search ................ 235/467, 472; 350/432; 250/566

[56] References Cited

U.S. PATENT DOCUMENTS

| | | | |
|---|---|---|---|
| 4,346,292 | 8/1982 | Routt, Jr. et al. | 250/216 |
| 4,496,831 | 1/1985 | Swartz et al. | 235/472 |
| 4,575,625 | 3/1986 | Knowles | 235/467 |
| 4,675,531 | 6/1987 | Clark et al. | 250/568 |
| 4,678,288 | 7/1987 | Lonsdale et al. | 350/432 |
| 4,694,182 | 9/1987 | Howard | 250/566 |
| 4,704,519 | 11/1987 | Kulikauskas | 238/472 |

Primary Examiner—Harold I. Pitts
Attorney, Agent, or Firm—Wilbert Hawk, Jr.; Albert L. Sessler, Jr.; Richard W. Lavin

[57] ABSTRACT

A hand-held bar code reader includes a source of scanning laser beams for scanning a coded label, a detector for detecting the light reflected from the coded label and a single piece composite optical lens structure. The lens structure has a first portion receiving the laser beams for reversing the direction of the laser beams. A second portion for focusing the laser beams on a rotating member which generates scanning beams for use in the scanning of the coded label and a third portion for collecting the light reflected from the coded label for focusing the reflected light on the detector.

15 Claims, 6 Drawing Sheets

COMPOSITE LENS FOR A HAND-HELD BAR CODE LABEL READER

CROSS-REFERENCE TO RELATED APPLICATION

Hand-Held Bar Code Reader, co-pending application, NCR Docket No. 4178, filed on even date, invented by Charles Wike.

BACKGROUND OF INVENTION

The present invention relates to optical bar code scanning devices which are used to read coded labels attached to purchased merchandise items and more particularly to an optical system for use in bar code readers.

In order to increase the speed of the checkout operation in supermarket and retail stores, optical scanning devices have been incorporated into checkout counters for reading a bar code pattern on labels affixed to purchased merchandise items. Where the type of merchandise sold does not readily lend itself to being checked out utilizing a bar code reader mounted within a checkout counter, hand-held bar code readers have been used wherein the checkout operator positions the bar code reader adjacent the coded label attached to the merchandise item. It is desirable that such a bar code reader be as compact in construction and as light as possible.

SUMMARY OF THE INVENTION

A hand-held optical bar code reader comprises a tubular casing having a flashlight configuration which includes a drive motor rotating a drive shaft to which is attached on its end a scanning mirror. Mounted adjacent to the drive shaft is a laser diode which emits a collimated, asymmetric light beam at a composite optical element member which includes an amorphic prism portion which elongates the light beam in one direction to circularize the beam. The composite optical element member further includes a pair of turning mirror portions which receive the light beam from the prism portion along a first axis and redirects the laser beam in the opposite direction along a second axis onto a focusing lens portion of the composite optical element member. The focusing lens portion converges the laser beam onto the rotating scanning mirror. Rotation of the scanning mirror redirects the laser light beam at a plurality of turning mirrors mounted on the inside periphery of the casing adjacent the front edge of the casing. The laser light beam is reflected by each of the turning mirrors to create a scanning pattern on the coded label. Light reflected from the coded label is collected by a collection mirror portion of the composite optical element member which focuses the collected light at a photodetector positioned adjacent the rotating shaft member. The photodetector generates electrical signals in response to receiving the reflected light which is then transmitted to processing means mounted within the casing which decodes the electrical signals to generate data for use in addressing a price lookup table located in a remote processing unit to obtain the price of the purchased merchandise item. The composite optical element member also includes a light emitting diode for use in detecting whether the scanning pattern generated by the turning mirrors is focused on the coded label.

It is therefore a principal object of this invention to provide a hand-held optical bar code reader which is compact in construction and light in weight.

It is another object of this invention to provide a low cost hand-held bar code reader in which the beam folding optics are incorporated into a one piece composite lens structure.

It is another object of this invention to provide a focusing member mounted in the composite optical element structure for use in focusing the scanning pattern on the coded label.

BRIEF DESCRIPTION OF THE DRAWINGS

These and other objects, features and advantages of the invention, as well as the invention itself, will become more apparent to those skilled in the art in light of the following detailed description taken in consideration with the accompanying drawings wherein like reference numerals indicate like or corresponding parts throughout the several views and wherein.

DESCRIPTION OF THE PREFERRED EMBODIMENT

Figure 1:
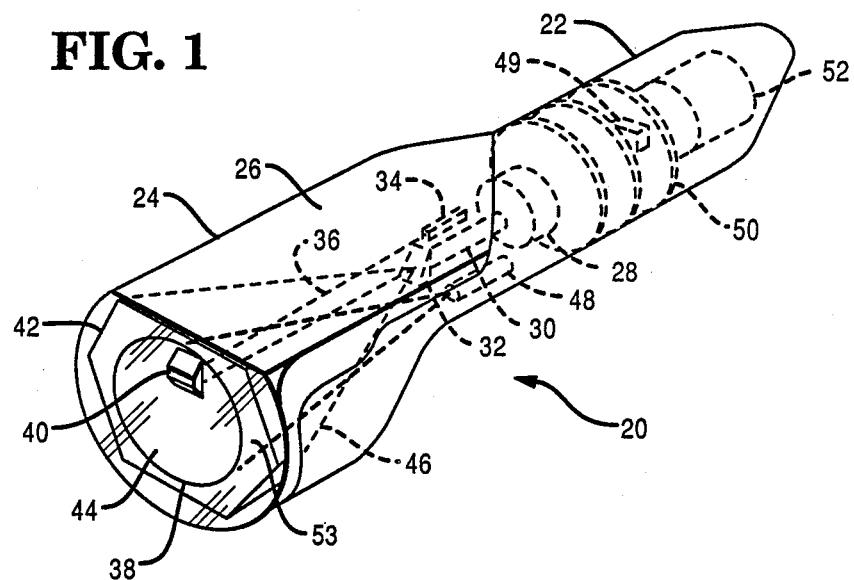
FIG. 1 is a perspective view of the hand held optical bar code reader incorporating the present invention.

Referring now to FIG. 1, there is shown a perspective view of a hand-held bar code reader generally indicated by the numeral 20 which comprises a tubular casing 22 formed in a flashlight configuration having a front cyclindrical portion 24 which includes a top flat rearward extending surface 26. As fully disclosed in the copending application NCR Docket No. 4178, the flat surface 26 may be attached to the underside of the wrist of a checkout operator enabling the checkout operator to utilize both hands in moving purchased merchandise items on a checkout counter while still retaining the bar code reader in a position to scan the coded label of a purchased merchandise item. Mounted within the casing 22 is a motor 28 which rotates a drive shaft 30 together with a scanning mirror 32 secured to the end of the drive shaft 30. Mounted adjacent the drive shaft is a laser diode 34 which projects a laser light beam 36 towards a composite optical element member 38 which includes a portion 40 comprising a pair of turning mirrors which redirects the light beams in a direction generally opposite to the direction of the light beams received from the diode 34 and towards the scanning mirror 32. Rotation of the scanning mirror 32 will project the light beam towards a number of turning mirrors 42 mounted on the inside peripheral surface of the front portion 24 of the casing 22. The turning mirrors 42 will redirect the light beams towards the coded label forming a scanning pattern for reading the coded label in a manner that is well known in the art. The light beams reflected from the coded label are collected by a collection mirror portion 44 of the composite optical element member 38 which redirects the reflected light beams 46 towards a photodetector 48 mounted adjacent to the drive shaft 30. The photodetector 48, in response to receiving the reflected light beams from the collection mirror portion 44, generates electrical signals in accordance with the intensity level of the reflected light beams received, which signals are transmitted to a processing member 49 mounted on electrical racks 50 located within the tubular casing 22. Associated with the electrical racks 50 is a power supply 52. A glass face plate 53 covers the front opening of the reader 20.

Figure 2:
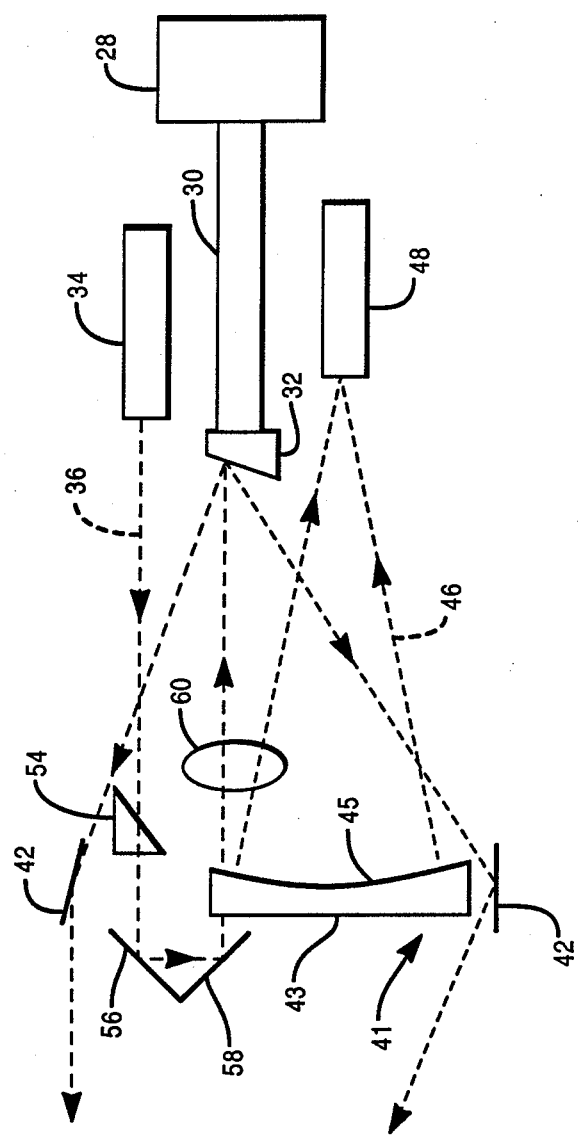
FIG. 2 is a diagrammatic representation of the elements of the scanning system in the bar code reader.

Referring now to FIG. 2, there is shown a diagrammatic representation of the scanning system incorporated in the optical bar code reader 20. The light beams 36 outputted by the laser diode 34 are directed along a first axis through an amorphic prism 54 which elongates the beams in one direction to circularize the beam. A pair of turning mirrors 56 and 58 acting by total internal reflection receive the circularized beams and direct the beams in a generally opposite direction along a second axis onto a focusing lens 60 which focuses the light beams onto the surface of the scanning mirror 32. Rotation of the scanning mirror 32 redirects the light beams toward the turning mirrors 42 which in turn redirect the light beams in a scan pattern 79 (FIGS. 7A-7D inclusive) towards a coded label (not shown) on the purchased merchandise item. The light beams reflected from the coded label are gathered by a collection mirror 44 which comprises a front vertical surface 43 facing the label and a rear concave surface 45 which focuses the reflected light beams 46 onto the photodetector 48 which generates electrical signals representing the data on the encoded label. The problem found with this type of construction is the critical alignment between the prism 54, the turning mirrors 56 and 58 and the focusing lens 60. In order to reduce this alignment problem and to reduce the weight of the bar code reader, the prism 54, mirrors 56 and 58, the focusing lens 60 and the collection mirror 44 are formed into a composite single unit.

Figure 3:
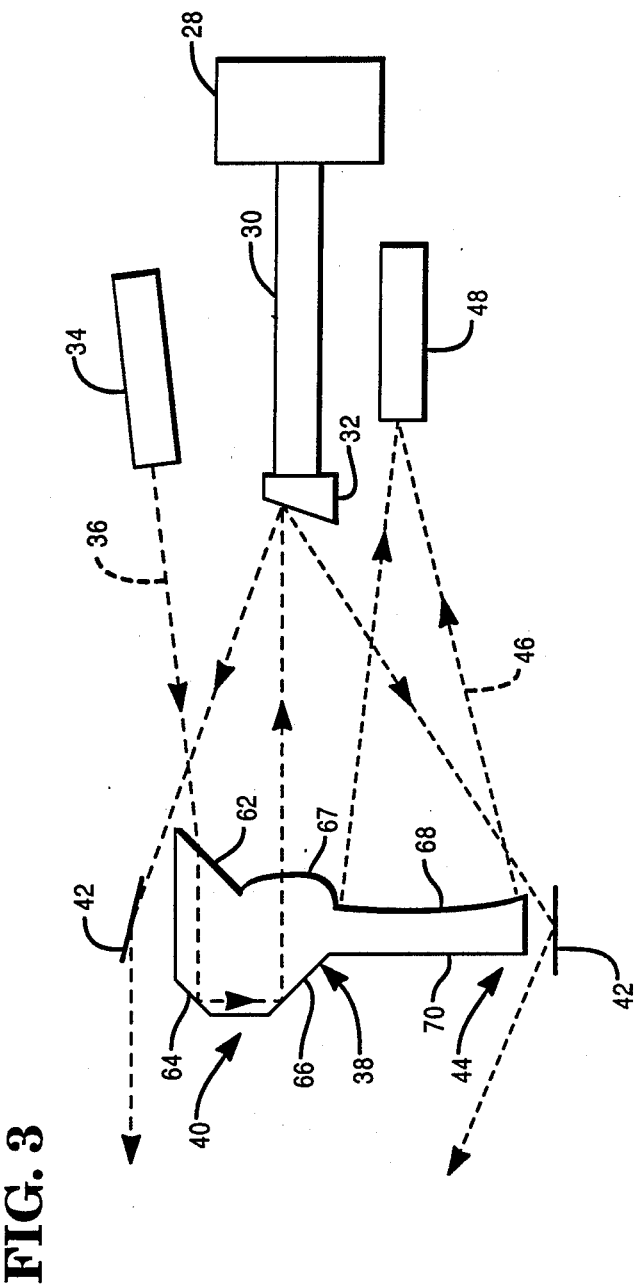
FIG. 3 is a diagrammatic representation of the elements of the scanning system in the bar code reader incorporating the composite optical element member of the present invention.
Figure 5:
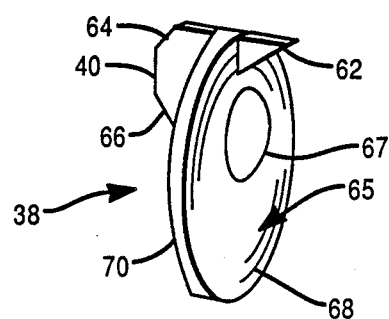
FIG. 5 is a perspective view of the composite optical element member of the present invention.

As best seen in FIGS. 3 and 5, the composite optical element member generally indicated by the numeral 38 includes a top rear portion 62 comprising the amorphic prism member 54 (FIG. 2), the turning mirror portion 40 which comprises a pair of inclined internal reflecting surfaces 64 and 66 extending in a rearward direction which comprise the turning mirrors 56 and 58 (FIG. 2) and an aspherical front portion 67 which forms the focusing lens member 60 (FIG. 2). The main portion of the composite optical element member 38 comprises the collection mirror portion 44 which has a rear concave surface 68 facing the detector 48 and a relatively plano front surface 70 facing the coded label for gathering the reflected light beams from the coded label. The concave surface 68 will focus the reflected light beams 46 at the detector 48 in the manner described previously. The paths of the light beams are the same as described with respect to FIG. 2 except that the laser diode 34 is slightly offset to the optical element member 38. The composite optical element member 38 may comprise a plastic molded structure.

Figure 4:
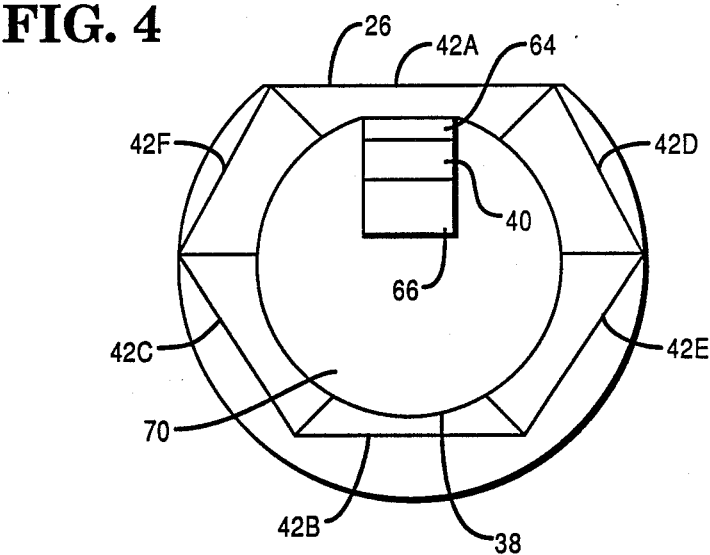
FIG. 4 is a front view of the bar code reader showing a plan view of the composite optical element member.

Referring now to FIG. 4, there is shown a front view of the optical bar code reader 20 showing the plano surface 70 of the composite optical element member 38 and the turning mirror surfaces 64 and 66. Mounted around the interior periphery of the casing 22 are six turning mirrors 42A-42D inclusive for directing the light beams in the form of a scanning pattern 79 (FIGS. 7A-7D inclusive) through which the coded label passes.

Figure 6:
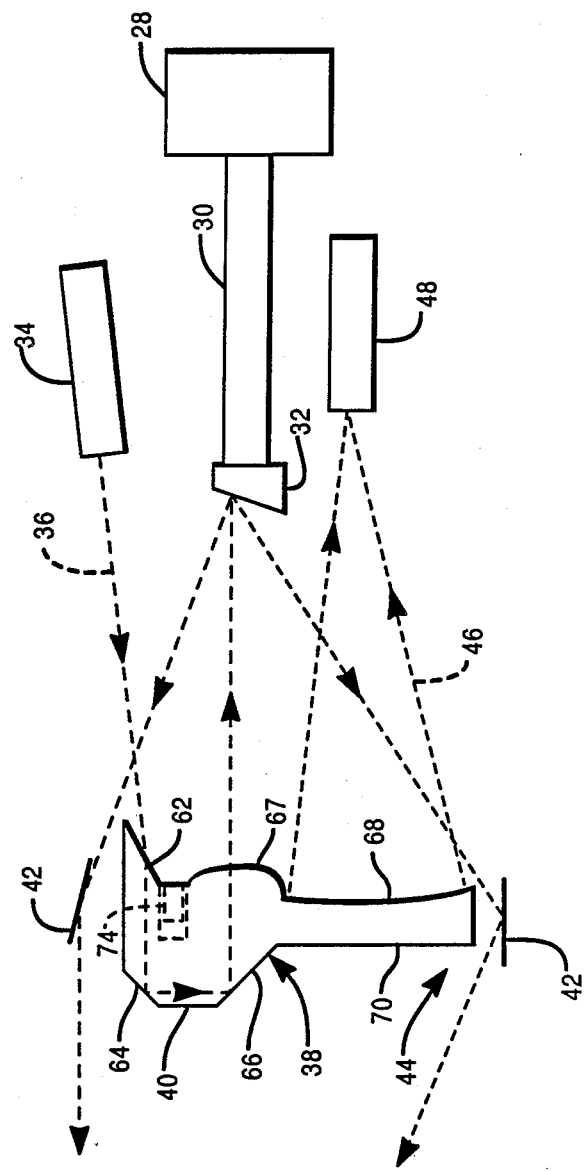
FIG. 6 is a diagrammatic representation of a second embodiment of the present invention in which a light emitting diode is mounted within the composite optical element member for use in focusing the scanning light beams on the coded label.
Figure 7A:
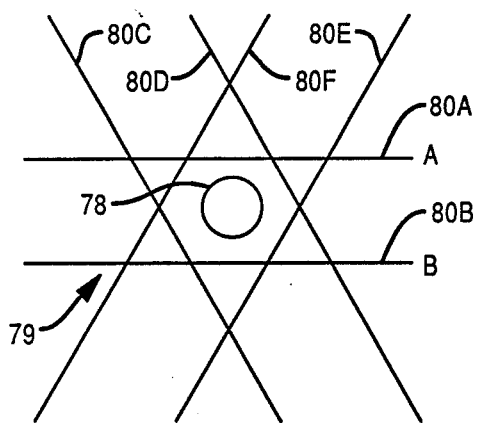
FIGS. 7A-7D inclusive are diagrammatic representations of the scanning pattern showing various focusing locations with respect to the focal plane through which the coded label moves.
Figure 7B:
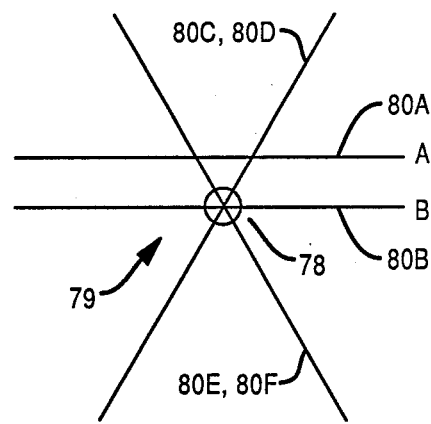
Figure 7C:
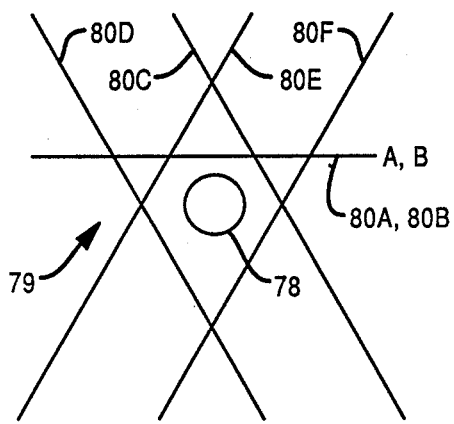
Figure 7D:
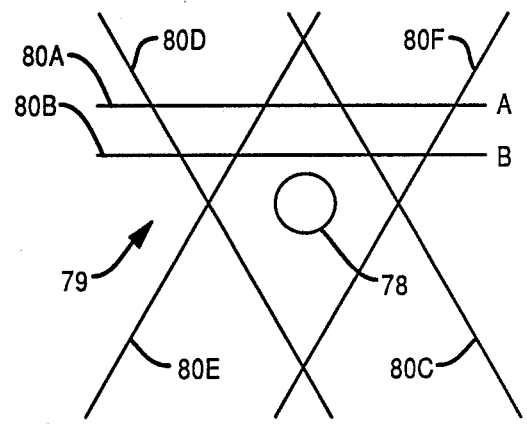

Referring now to FIG. 6, there is shown a diagrammatic illustration of a scanning system which is similar to FIG. 3 in which a light emitting diode (LED) 74 is mounted in the composite optical element member 38 for projecting a circular light beam 78 (FIGS. 7A-7D inclusive) towards the focal plane through which the coded label is moving. As shown in FIGS. 7A-7D inclusive, the circular light beam 78 from the LED 74 will appear adjacent the scan lines 80. As shown in FIG. 7A, the turning mirrors 42A and 42B (FIG. 4) will generate the scan lines 80A and 80B respectively. The upper turning mirrors 42C and 42D will generate the scan lines 80C and 80D respectively while the scanning mirrors 42E and 42F will generate the scan lines 80E and 80F respectively. When the scanning pattern is in focus (FIG. 7B) on the plane through which the coded label passes, the scanning lines 80C, 80D, 80E and 80F will coincide in the same plane with the circular light beam 78 appearing at the intersection of the aforementioned scan lines and the scan line 80B. When in focus, the diameter of the light beam 78 will be at its smallest together with the edge of the beam being sharply defined. FIG. 7A represents the condition of the scanning pattern 79 when inside the focal plane while FIGS. 7C and 7D represent the scanning pattern outside the focal plane. It will be seen that the operator utilizing the size and location of the circular light beam 78 with respect to the location of the scan lines can focus the scanning pattern 79 in a manner that is simple and easy and which will not detract from the speed of processing the purchased merchandise item.

While the salient features of the invention have been illustrated and described, it should be readily apparent to those skilled in the art that many changes and modifications can be made in the invention presented without departing from the spirit and true scope of the invention. Accordingly, the present invention should be considered as encompassing all such changes and modifications of the invention that fall within the broad scope of the invention as defined by the appended claims.

What is claimed is:

1. A hand-held optical bar code scanner for projecting scanning light beams at a target and detecting the light reflected from the target comprising:
   a casing member having an opening at one end;
   means mounted in said casing member for projecting scanning light beams along a first axis;
   an optical structure mounted in the opening of said casing member including first reflecting means mounted in said first axis receiving said scanning light beams for reflecting the light beams along a second axis in a direction which is opposite to the direction of the received scanning light beams;
   a rotating member mounted in said second axis;
   second reflecting means mounted on said rotating member in said second axis for deflecting the received scanning light beams along a plurality of light paths;

a plurality of third reflecting means mounted around the interior periphery of the casing member adjacent the opening, each of said third reflecting means being located in one of said light paths for reflecting the received light beams in a scanning direction at the target;

said optical structure further including mirror means positioned adjacent the third reflecting means for collecting the light reflected from the target and focusing the reflected light at a location adjacent the rotating means; and detecting means mounted in said location and receiving the reflected light for generating electrical signals representing coded data stored on the target in response to receiving the reflected light.

2. The optical bar code reader of claim 1 in which said first reflecting means comprises a pair of mirror surfaces orientated at a right angle to each other for reversing the direction of the received scanning light beams.

3. The optical bar code reader of claim 2 in which said optical structure further includes means positioned in said first axis between said projecting means and said first reflecting means for circularizing the scanning light beams output of said projecting means.

4. The optical bar code reader of claim 3 in which said optical structure further includes focusing means mounted adjacent said first reflecting means in said second axis for focusing the light beams on said second reflecting means.

5. A hand-held optical bar code scanner for projecting a scanning light beam at a coded label containing data and for detecting the light reflected from the coded label comprising:

a casing member having an opening at one end;

means mounted in said casing member for projecting a scanning light beam along a first axis;

a lens member mounted adjacent the opening of the casing member having a first portion located in said first axis containing a pair of turning surfaces for deflecting the scanning light beam along a second axis in a direction which is opposite to the direction of the received scanning light beam;

a rotating member mounted in said second axis;

first deflecting means mounted on said rotating member in said second axis for deflecting the received scanning light beam along a plurality of light paths;

a plurality of second deflecting means mounted around the interior periphery of the casing member adjacent the opening, each of said second reflecting means mounted in one of said light paths for deflecting the received light beam at a coded label in the form of a scanning pattern;

said lens member further including a second portion for collecting the light reflected from the coded label, said second portion having a concave surface for focusing the collected light at a location adjacent the rotating member; and detector means mounted at said location adjacent the rotating member for receiving the collected light, said detector means generating electrical signals representing the data stored on the coded label in response to receiving the collected light.

6. The bar code scanner of claim 5, in which said lens member includes a third portion mounted in said second axis for focusing the scanning light beam on the first deflecting means.

7. The bar code scanner of claim 6, in which said lens member further includes a fourth portion mounted in said first axis for circularizing the scanning light beam.

8. The bar code scanner of claim 7, in which said lens member further includes a source of light beams for projecting the light beams on the coded label for use in focusing the scanning pattern on the coded label.

9. The bar code scanner of claim 8, in which the lens member is a plastic molded structure.

10. A composite single piece optical lens member for use in a hand-held optical bar code reader of the type projecting a scanning light beam at a coded label and detecting the light reflected from the coded label for reading the data contained in the coded label comprising:

an optical lens structure having a first portion receiving a scanning light beam along a first axis and containing a pair of reflecting surfaces mounted at an angle to each other for reflecting the received light beam along a second axis and towards a scanning element associated with the lens member, said received light beam being reflected by said reflecting surfaces in a direction which is opposite to the direction of the received light beam on said axis; and a second portion having a first surface facing the coded label for collecting the scanning light beams reflected from the coded label and a concave surface located adjacent the first surface for focusing the reflected light at a detector associated with the lens member.

11. The lens member of claim 10, in which the lens structure further includes a third portion located in said first axis for circularizing the scanning light beam received on said first axis.

12. The lens member of claim 11, in which the lens structure comprises a circular-shaped disk member having a plano surface which is positioned facing the coded label and a concave surface which is positioned facing the detector, said third portion extending outwardly from the concave surface along said first axis.

13. The lens member of claim 12, in which the first portion of the lens structure extends outwardly from said plano surface towards the coded label and located in said first axis for reversing the direction of the scanning light beam.

14. The lens member of claim 13, in which the lens structure further includes a fourth portion extending outwardly from said concave surface and located in said second axis for focusing the scanning light beam on the scanning element associated with the lens member.

15. The lens member of claim 14 in which the fourth portion has an aspherical surface facing the scanning element.

* * * * *